United States Patent
Otten et al.

(10) Patent No.: US 8,125,179 B2
(45) Date of Patent: Feb. 28, 2012

(54) CONTROLLING A POWER OF AN ELECTRICAL MOTOR

(75) Inventors: Wessel Adolf Otten, Drachten (NL); Wilhelmus Ettes, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 238 days.

(21) Appl. No.: 12/529,547

(22) PCT Filed: Mar. 6, 2008

(86) PCT No.: PCT/IB2008/050817
§ 371 (c)(1),
(2), (4) Date: Sep. 2, 2009

(87) PCT Pub. No.: WO2008/110964
PCT Pub. Date: Sep. 18, 2008

(65) Prior Publication Data
US 2010/0109598 A1    May 6, 2010

(30) Foreign Application Priority Data
Mar. 9, 2007  (EP) ..................... 07103881

(51) Int. Cl.
*H02P 23/00* (2006.01)
*H02P 25/00* (2006.01)
*H02P 27/00* (2006.01)
*H02P 27/04* (2006.01)

(52) U.S. Cl. ................ 318/811; 318/400.29; 318/400.3; 318/800; 318/801; 318/802; 361/23; 361/33

(58) Field of Classification Search ................... 318/811, 318/400.29, 400.3, 800, 801, 802; 361/23, 361/33
See application file for complete search history.

(56) References Cited

U.S. PATENT DOCUMENTS

| | | | | |
|---|---|---|---|---|
| 4,763,347 | A * | 8/1988 | Erdman | 318/400.22 |
| 5,021,726 | A * | 6/1991 | Reinhardt et al. | 318/811 |
| 6,118,186 | A * | 9/2000 | Scott et al. | 290/40 B |
| 7,202,619 | B1* | 4/2007 | Fisher | 318/400.29 |
| 2005/0046369 | A1* | 3/2005 | Kobayashi et al. | 318/432 |
| 2007/0223545 | A1* | 9/2007 | Saito et al. | 372/36 |
| 2010/0046369 | A1* | 2/2010 | Zhao et al. | 370/232 |

FOREIGN PATENT DOCUMENTS

| | | |
|---|---|---|
| EP | 0221574 A2 | 5/1987 |
| EP | 0989666 A1 | 3/2000 |
| EP | 1017156 A1 | 7/2000 |
| EP | 1612924 A2 | 1/2006 |
| JP | 60087648 | 5/1985 |
| JP | 2003023800 | 1/2003 |
| JP | 2004135425 | 4/2004 |
| WO | 2006033085 A2 | 3/2006 |

* cited by examiner

Primary Examiner — Bentsu Ro
Assistant Examiner — Erick Glass

(57) ABSTRACT

A motor control circuit (MC) comprising input terminals (IT1, IT2) to receive a rectified input voltage (Vrm), and output terminals (OT1, OT2) to supply a motor drive signal (Vm). A switching circuit (1) is alternately in an on-state (Ton) and an off-state (Toff) for intermittently coupling the input terminals (IT1, IT2) to the output terminals (OT1, OT2). A controller (2) controls the switching circuit (1) to be (i) in the on-state (Ton) during a first period in time (T1) when an amount of magnetic saturation of the motor is smaller than a predetermined value, and (ii) alternately in the on-state (Ton) and the off-state (Toff) to obtain a pulse width control of the motor drive signal (Vm) during a second period in time (T2) when the amount of magnetic saturation of the motor is larger than the predetermined value.

11 Claims, 3 Drawing Sheets

CONTROLLING A POWER OF AN ELECTRICAL MOTOR

FIELD OF THE INVENTION

The invention relates to a motor control circuit, a motor system comprising the motor control circuit, an appliance comprising the motor system, and a method of controlling a motor power.

BACKGROUND OF THE INVENTION

Power control of an AC series motors with a triac is well known. An example of a triac control circuit is disclosed in WO2006/033085A2. The control of the current through the motor with a triac has the disadvantage that the lifetime of the brushes decreases.

SUMMARY OF THE INVENTION

It is an object of the invention to provide a power control of an AC motor with a longer lifetime of the brushes.

A first aspect of the invention provides a motor control circuit as claimed in claim 1. A second aspect of the invention provides a motor system as claimed in claim 8. A third aspect of the invention provides an appliance as claimed in claim 9. A fourth aspect of the invention provides a method of controlling a motor power as claimed in claim 11. Advantageous embodiments are defined in the dependent claims.

A motor control circuit in accordance with the first aspect of the invention comprises input terminals to receive a rectified input voltage and output terminals to supply a motor drive signal to the motor. The motor may be voltage or current driven. Usually, the rectified input voltage is the unbuffered rectified sinusoidal shaped mains voltage.

A switching circuit is arranged between the input terminals and the output terminals. The power of the motor is controlled by using a PWM (pulse width modulation) approach wherein the switching circuit is alternately in an on-state and an off-state. The ratio of the durations of the on-state and the off-state determines the power of the motor. If the switching circuit is in the on-state, the input terminals are coupled to the output terminals to provide the rectified input voltage to the motor. If the switching circuit is in the off-state, the rectified input voltage is decoupled from the motor.

A controller controls the switching circuit to be in the on-state during a first period in time when an amount of magnetic saturation of the motor is smaller than a predetermined value. Thus, as long as the magnetic saturation of the stator and/or rotor of the motor is below a predetermined value, the AC input voltage is continuously coupled to the motor. During a second period in time, when the amount of magnetic saturation of the motor is larger than the predetermined value, the controller controls the switching circuit to be alternately in the on-state and the off-state to obtain the pulse width modulation control of the motor drive signal. Thus, the pulse width modulation control is only active as long as the stator and/or rotor of the motor is magnetically saturated above a predetermined non-zero level. Usually, the predetermined level depends on the actual type of motor or even a particular motor used. The predetermined level may be found for a particular type of motor or a particular motor by performing lifetime tests with different levels at which the continuous on-state is changed into the PWM phase and checking the respective lifetime of the brushes. Therefore, if the expression "sufficient magnetic saturation" is used, this means a saturation level of the motor at which the desired lifetime of the brushes is reached.

For series motors of which the stator and/or rotor is sufficiently in magnetic saturation, the variation of the magnetic flux as function of a variation of the current through the motor is much less than if the motor is not in magnetic saturation. Or said differently, a particular delta-current through the motor causes a much larger delta-flux at small currents than at large currents. Consequently, if the pulse width modulation is affected at small currents, relatively large flux variations result. These large flux variations induce high voltages which cause high currents through the brushes and shorten the lifetime of the brushes. The present invention therefore first supplies the rectified input voltage to the motor without performing PWM to slowly build up sufficient current through the motor to obtain a sufficient high magnetic saturation before the PWM is activated. Thus, when the PWM is activated, due to the relatively high magnetic saturation, the induced voltages caused by the current variations through the motor are much lower and the life time of the brushes is longer.

In an embodiment, the motor control circuit further comprises a sense circuit to sense a value of a parameter which indicates the amount of magnetic saturation of the motor. A comparator compares the value of the parameter with the predetermined value to obtain a comparison value. The controller controls the switching circuit to be continuously in the on-state when the comparison value indicates that an amount of saturation of the motor is smaller than the predetermined value. Consequently, as long as the amount of magnetic saturation is smaller than the predetermined value, the pulse width modulation control is inhibited and the rectified input voltage is continuously coupled across the motor.

In an embodiment, the sense circuit comprises a level detector to detect a level of the rectified input voltage. The comparator compares this level with the predetermined value to obtain a comparison value. The controller controls the switching circuit to be in the on-state when the comparison value indicates that a value of the level of the rectified input voltage is smaller than the predetermined value. Thus, as long as the value of the rectified input voltage is below the predetermined value, the pulse width modulation control is inhibited.

In an embodiment, the sense circuit comprises a detecting circuit to detect a zero level of the rectified input voltage. The controller controls the switching circuit to be in the on-state during a predetermined period in time after the zero level has been detected. The duration of the predetermined period in time is selected such that after this period in time the magnetic saturation of the motor is higher than the predetermined level. In the same manner, also the starting moment of the time period during which the pulse width modulation is inhibited at the end of the half period of the rectified input voltage can be timed starting from the preceding zero level of the rectified input voltage.

In an embodiment the sense circuit comprises a detecting circuit which detects a ratio of a variation of a drive current supplied to the output terminals and a variation of a drive voltage across the output terminals. This ratio is a measure for the amount of saturation of the motor. The controller controls the switching circuit to be in the on-state when the ratio is larger than the predetermined value.

In an embodiment the switching circuit comprises a full bridge of electronic switches. The controller is constructed for controlling the electronic switches of the full bridge to obtain an AC motor drive signal.

Such a motor control circuit can advantageously used in a motor system which comprising a motor and the motor control circuit. The motor system may be implemented in an appliance such as for example, vacuum cleaners, washing machines, shavers, blenders, or kitchen machines.

These and other aspects of the invention are apparent from and will be elucidated with reference to the embodiments described hereinafter.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION

Figure 1:
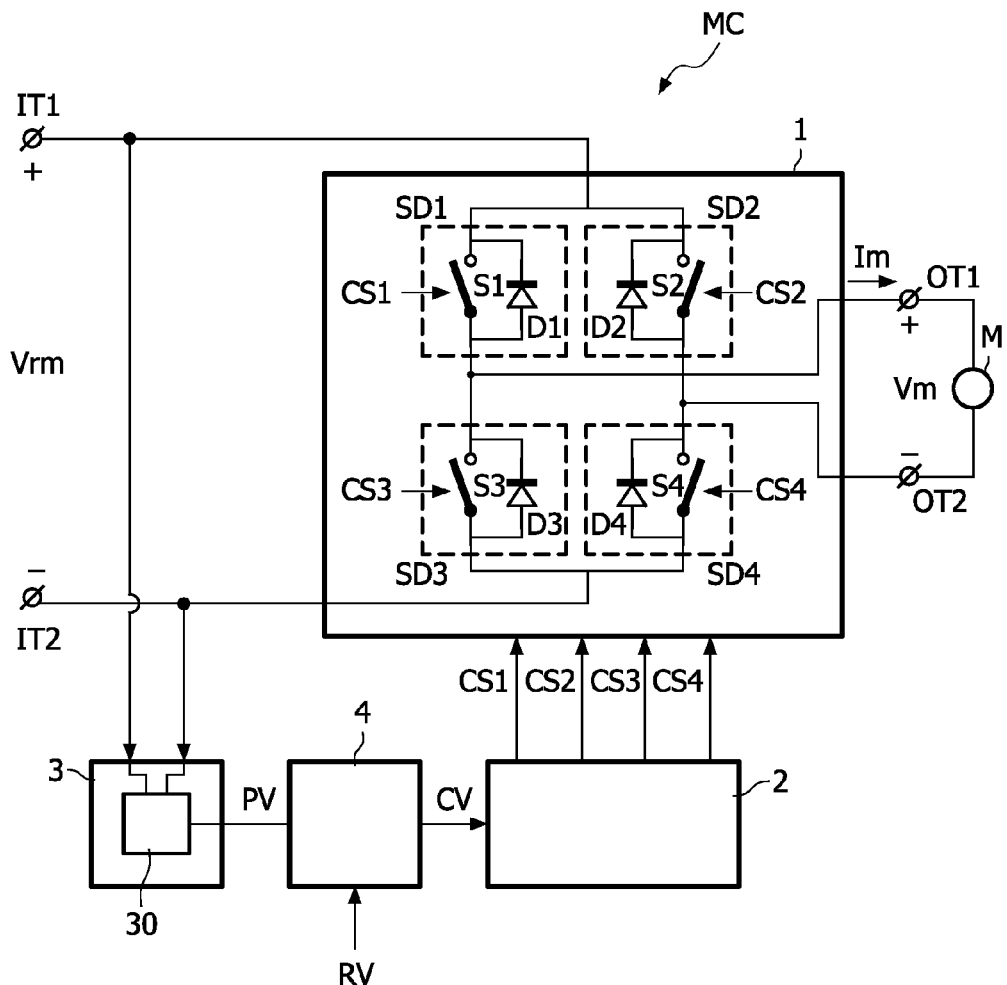
FIG. 1 schematically shows a circuit diagram of an embodiment of a motor system which comprises a motor control circuit and a motor, FIG. 2 schematically shows a circuit diagram of an embodiment of a sense circuit of the motor control circuit, FIG. 3 schematically shows a circuit diagram of another embodiment of a sense circuit of the motor control circuit, FIG. 4 schematically shows an embodiment of a drive signal generated by the motor control circuit, FIG. 5 schematically shows an embodiment of a switching circuit of the motor control circuit, and FIG. 6 schematically shows an embodiment of a vacuum cleaner which comprises the motor and the motor control circuit.

FIG. 1 schematically shows a circuit diagram of an embodiment of a motor system which comprises a motor control circuit MC and a motor M. The motor control circuit MC comprises input terminals IT1, IT2 to receive a rectified input voltage Vrm. Preferably, the rectified input voltage Vrm is an unbuffered rectified mains voltage. With unbuffered is meant not smoothed by capacitors. The motor M is coupled between output terminals OT1, OT2 of the motor control circuit MC.

A switching circuit 1 is arranged between the input terminals IT1, IT2 and the output terminals OT1, OT2 to intermittently couple the output terminals OT1, OT2 to the input terminals IT1, IT2. If the switching circuit 1 is in the on-state Ton (see FIG. 4 for the associated on-period of time), the rectified input voltage Vrm is coupled via the switching circuit 1 to the motor M to supply the AC drive voltage Vm and the drive current Im to the motor M. If the switching circuit 1 is in the off-state Toff (see FIG. 4 for the associated off-period in time), the rectified input voltage Vrm is decoupled from the output terminals OT1, OT2 and the motor M is freewheeling or is short-circuited by the switching circuit 1.

The switching circuit 1 may comprise a full bridge of electronic switching devices SD1 to SD4 which are controlled by the control signals CS1 to CS4, respectively to convert the rectified input voltage Vrm into the AC drive voltage. The electronic switching devices SD1 to SD4 may be MOSFET's or IGBT's which comprise a switching path S1 to S4, respectively, and an internal parallel diode D1 to D4, respectively.

The switching circuit 1 is in the off-state Toff if either all the switching devices SD1 to SD4 are in the non-conductive state (or said differently, the corresponding switch S1 to S4 is open), if both the switching devices SD1 and SD2 are non-conductive, or if both the switching devices SD3 and SD4 are non-conductive. The controller 2 can control the full bridge such that the motor M is short-circuited during the off-state Toff. For example let it be assumed that the switching devices SD1 and SD4 are conductive (the associated switches S1 and S4 are closed) during the on-state Ton preceding the off-state Toff. At the start of the off-state, the switch S1 is opened while the switch S4 is kept close. The drive current Im now flows in a closed loop formed by the closed switch S4 and the diode D3.

During the on-state of the switching circuit 1, the controller 2 can control the full bridge such that the drive voltage Vm to the motor M is an AC voltage which has opposite polarity during successive half periods of the rectified input voltage Vrm. For example, the switches S1 and S4 are closed and the switches S2 and S3 are open during first half periods of the rectified input voltage Vrm, which are associated with half periods of the mains voltage, which have a first polarity. Then, the switches S1 and S4 are opened, and the switches S2 and S3 are closed during second half periods of the rectified input voltage Vrm, which are associated with half periods of the mains voltage which have a second polarity opposite to the first polarity.

Alternatively (not shown), a single switching device with freewheeling diode may be used to intermittently couple the rectified input voltage Vrm across the motor M. Such a simple switching circuit 1 has the drawback that the motor is driven by a DC voltage, which may deteriorate the lifetime of the brushes.

The controller 2 controls the switching circuit 1 such that as long as the magnetic saturation of the motor M is below a predetermined level, the PWM control is inhibited. With magnetic saturation of the motor M is meant the magnetic saturation of the stator and rotor material of the motor M. The stator and rotor material may be a laminated magnetizable material such as for example iron. During the period in time that the motor M is not sufficiently magnetized, the controller 2 controls the switching circuit 1 to couple the rectified input voltage Vrm across the motor. Due to the rectified sine wave shape of the rectified input voltage Vrm, the drive current Im slowly increases and the variation of the flux in the motor M is relatively low. Once the drive current Im is sufficiently high, the motor M will be sufficiently magnetically saturated and the PWM control can be activated. Due to the magnetic saturated motor M, the large variations of the drive voltage Vm cause a relative low flux in the motor M and the current through the brushes will be relatively small. Consequently, in such a motor drive system wherein the PWM control is inhibited during periods in time the motor is insufficiently magnetic saturated, the life time degradation of the brushes due to the PWM power control will be relatively small.

The sensing of whether the motor M is sufficiently magnetically saturated can be performed in many ways.

In the embodiment shown in FIG. 1, the sense circuit 3 comprises a level detector 30 which receives the rectified input voltage Vrm and supplies a level signal PV which is representative of the actual level of the rectified input voltage Vrm. For example, the level detector 30 may comprise a resistor-tap to tap-in the rectified input voltage Vrm to level suitable for the comparator 4. The comparator 4 compares the level signal PV with a predetermined value RV and supplies a comparator signal CV to the controller 2. As long as the rectified input voltage Vrm has a level for which the level signal PV is below the predetermined value RV, the comparator signal CV is in a first logic state indicating to the controller 2 to control the switching circuit 1 to continuously supply the rectified input voltage Vrm to the motor M. As long as the rectified input voltage Vrm has a level for which the level signal PV is higher than the predetermined value RV, the control signal CV is in a second logical state indicating to the control circuit 1 to PWM control the switching circuit 1.

Instead of sensing the actual level of the rectified input voltage Vrm, alternatively, the drive current Im may be sensed and compared with a predetermined value. As long as the drive current Im is below a predetermined value, the controller 2 controls the switching circuit 1 to supply the rectified input voltage Vrm to the motor M continuously, thereby inhibiting the PWM control of the switching circuit 1 until the drive current Im is larger than the predetermined value RV.

Figure 2:
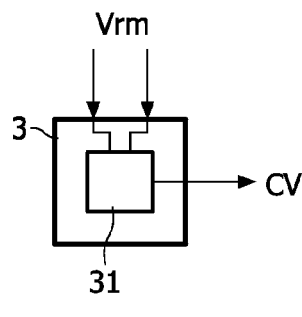
Figure 3:
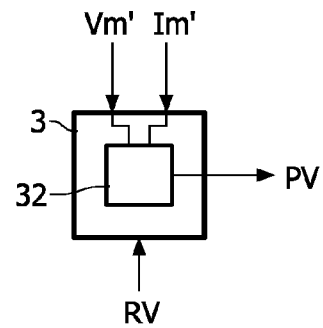

Further alternative embodiments of the sense circuit are discussed with respect to FIGS. 2 and 3.

FIG. 2 schematically shows a circuit diagram of an embodiment of a sense circuit 3 of the motor control circuit MC. The sense circuit 3 comprises a zero level detector 31 which detects the instants in time the rectified input voltage Vrm has a zero level or a value very near to zero. The voltage near to zero may be caused by, for example, a diode forward voltage which may be required to detect a non-zero level of the rectified input voltage Vrm. The output signal CV of the zero level detector 31 is directly fed to the controller 2. Thus, in this embodiment, the comparator 4 shown in FIG. 1 is not present in-between the sense circuit 3 and the controller 2. In fact, the zero level circuit 31 may be a comparator which compares the rectified input voltage Vrm with a zero level. The controller 2 now performs a timer operation to inhibit the PWM control of the switching circuit 1 until a predetermined period of time after the detected zero level of the rectified input voltage Vrm.

It has to be noted that if the rectified input voltage Vrm is the rectified AC mains voltage, the zero crossing of the AC mains voltage may be detected instead of the zero level of the rectified input voltage Vrm.

FIG. 3 schematically shows a circuit diagram of another embodiment of a sense circuit 3 of the motor control circuit MC. Instead of the rectified input voltage Vrm, the sense circuit 3 now receives a signal Vm' representative for the drive voltage Vm and the signal Im' representative for the drive current Im. The signal Vm' may be a tapped-in version of the drive voltage Vm. The signal Im' may be obtained by a current transformer or as a voltage across a small resistor in series with the motor M. The detecting circuit 32 determines a ratio of the variation of the drive current Im and the drive voltage Vm. The controller 2 inhibits the PWM control of the switching circuit 1 as long as the ratio is larger than a predetermined value RV.

Figure 4:
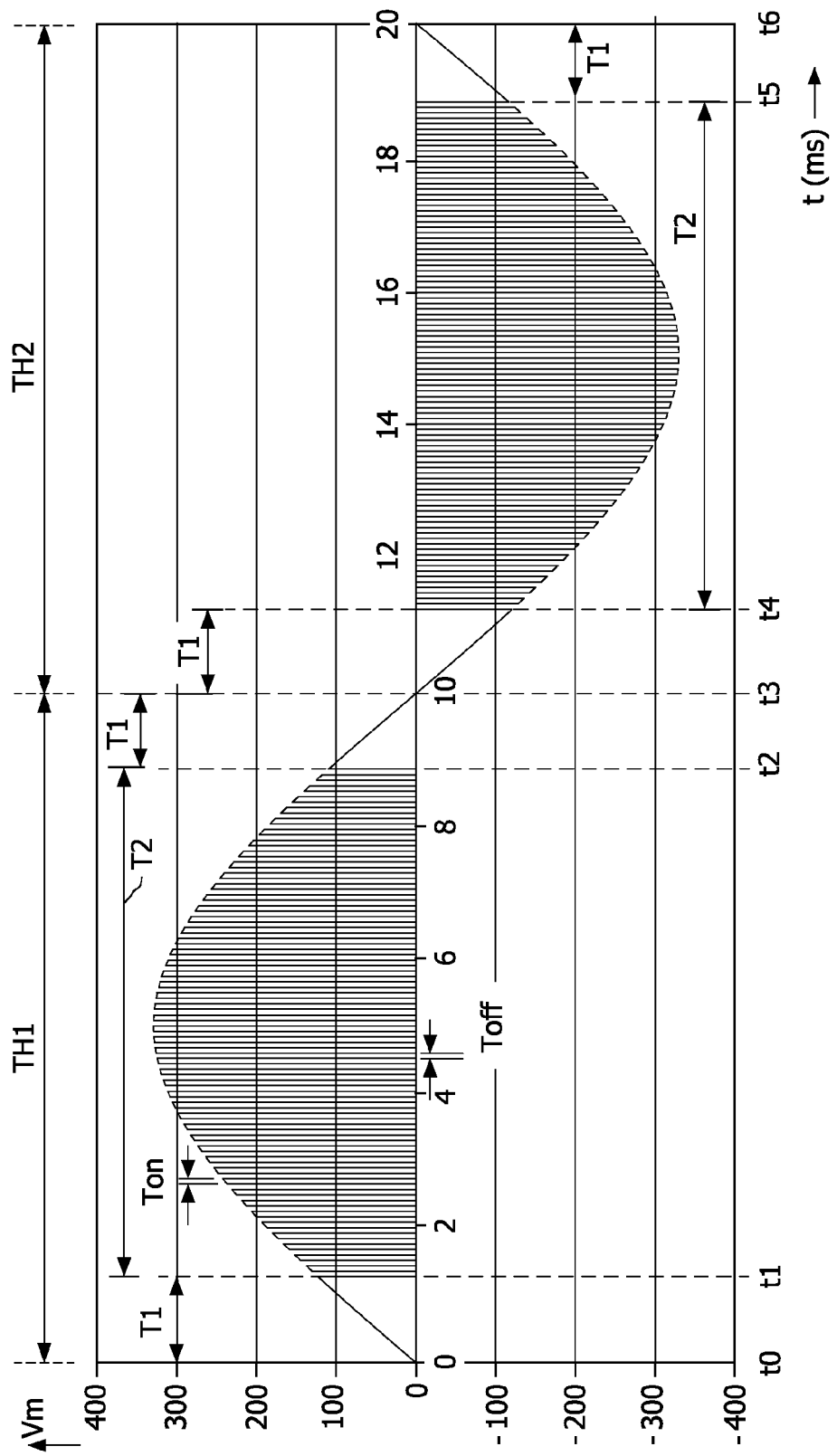

FIG. 4 schematically shows an embodiment of a drive signal Vm generated by the motor control circuit MC. In the following explanation of how the FIG. 1 motor control circuit MC operates, it is assumed that during the off-state of the switching circuit 1 short-circuits the motor M.

FIG. 4 shows two half periods of the AC drive voltage Vm. The drive voltage Vm has a positive polarity during the first half period TH1 which lasts from the instant t0 to the instant t3. The drive voltage Vm has a negative polarity during the second half period TH2 which lasts from the instant t3 to t6. The envelope of the drive voltage Vm is approximately identical to the rectified input voltage Vrm. A small difference is caused by voltage drops in the switching circuit 1.

During the periods in time indicated by T1, the sinusoidal shaped rectified input voltage Vrm has a low level, the magnetic saturation of the motor M is still low and the switching circuit 1 is continuously in the on-state to couple the rectified input voltage Vrm across the motor M. During the periods in time indicated by T2, the magnetic saturation of the motor M is sufficiently high to allow the controller 2 to PWM control the switching circuit 1.

As is clear from the period in time lasting from t2 to t4, the switching circuit 1 was already coupling the rectified input voltage Vrm across the motor M before the instant t0. Thus, at the instant t0 when the switching circuit 1 still couples the rectified input voltage Vrm across the motor M, the drive voltage Vm reaches the zero level. The switching circuit 1 is in the on-state Ton until the instant t1. At the instant t1 the magnetic saturation of the motor M is sufficiently high and the controller 2 starts the PWM control of the switching circuit 1. The controller 2 ends the PWM control at the instant t2 at which the magnetic saturation of the motor M drops below the desired amount. During the period in time lasting from instant t2 to t4 the PWM control is inhibited again and the switching circuit 1 is continuously in its on-state Ton. In the embodiment shown in FIG. 4, this period in time is centered on the zero level of the rectified input voltage Vrm. It has to be noted that before the instant t3 another pair of switches is active then after this instant. For example, the switches S1 and S4 are closed from the instant t2 to t3, and the switches S2 and S3 are closed from the instant t3 to t4. During the period in time T2 lasting from the instant t4 to t5, the PWM control is active again, while during the period in time T1 lasting from the instant t5 to t6 the PWM control is inhibited again.

During the periods in time T2, the PWM control is active and the controller 2 controls the power of the motor M by controlling the ratio of the on-periods in time Ton and the off-periods in time Toff. The drive voltage Vm shown in FIG. 4 is valid for a full bridge switching circuit 1. The full bridge enables to convert the DC rectified input voltage Vrm into an AC drive voltage Vm. Further, the full bridge enables to short-circuit the motor M during the off-periods Toff.

Figure 5:
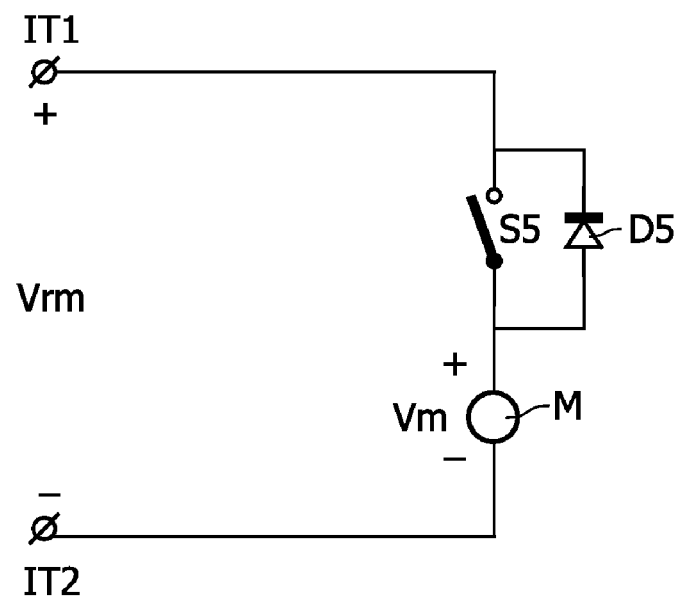

FIG. 5 schematically shows an embodiment of a switching circuit of the motor control circuit. The switching circuit 1 now comprises a single electronic switch S5 with an internal diode D5. The parallel arrangement of the switch S5 and the diode D5 is arranged in series with the motor M to receive the rectified voltage Vrm.

Figure 6:
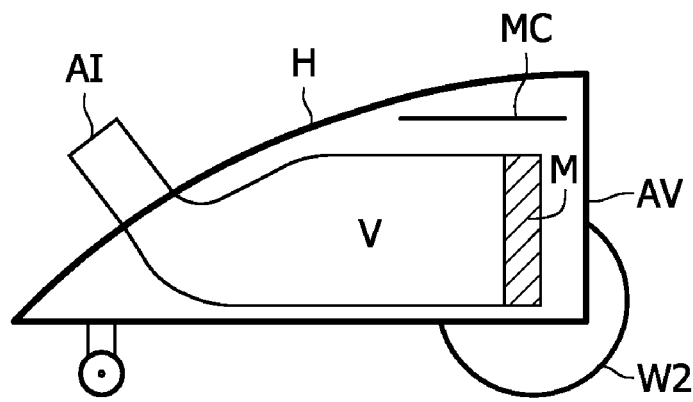

FIG. 6 schematically shows an embodiment of a vacuum cleaner which comprises the motor M and the motor control circuit MC. The vacuum cleaner comprises a housing H and wheels W1 and W2. A motor M sucks air into an air inflow AI and stores debris in the volume V. The air leaves the housing H via air vents AV. The motor control circuit MC controls the motor M. The motor control circuit MC controls the power of the motor M with the partly inhibited PWM control as discussed herein before. The motor control circuit MC may receive user input indicating a desired power setting.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A motor control circuit (MC) comprising:
    input terminals (IT1, IT2) for receiving a rectified input voltage (Vrm),
    output terminals (OT1, OT2) for supplying a motor drive signal (Vm),
    a switching circuit (1) being alternately in an on-state (Ton) and an off-state (Toff) for intermittently coupling the input terminals (IT1, IT2) to the output terminals (OT1, OT2),
    a controller (2) for controlling the switching circuit (1) to be
(i) in the on-state (Ton) during a first period in time (T1) when an amount of magnetic saturation of the motor is smaller than a predetermined value, and
(ii) alternately in the on-state (Ton) and the off-state (Toff) to obtain a pulse width control of the motor drive signal (Vm) during a second period in time (T2) when the amount of magnetic saturation of the motor is larger than the predetermined value.

2. A motor control circuit (MC) as claimed in claim 1, further comprising:
    a sense circuit (3) for sensing a value (PV) of a parameter for indicating the amount of saturation, and
    a comparator (4) for comparing the value (PV) of the parameter with the predetermined value (RV) to obtain a comparison value (CV), and wherein the controller (2) is constructed for controlling the switching circuit (1) to be in the on-state (Ton) when the comparison value (CV) indicates that an amount of magnetic saturation of the motor is smaller than the predetermined value (RV).

3. A motor control circuit (MC) as claimed in claim 2, wherein the sense circuit (3) comprises a level detector (30) for detecting a level of the rectified input voltage (Vrm), and wherein the controller (2) is constructed for controlling the switching circuit (1) to be in the on-state (Ton) when the comparison value (CV) indicates that a value of the level of the rectified input voltage (Vrm) is smaller than the predetermined value (RV).

4. A motor control circuit (MC) as claimed in claim 2, wherein the sense circuit (3) comprises a detecting circuit (31) for detecting a zero level of the rectified input voltage (Vrm), and wherein the controller (2) is constructed for controlling the switching circuit (1) to be in the on-state (Ton) during a predetermined period in time (T1) after the zero level has been detected.

5. A motor control circuit (MC) as claimed in claim 2, wherein the sense circuit (3) comprises a detecting circuit (32) for detecting a ratio of a variation of a drive current (Im) supplied to the output terminals (OT1, OT2) and a variation of a drive voltage (Vm) across the output terminals (OT1, OT2), and wherein the controller (2) is constructed for controlling the switching circuit (1) to be in the on-state (Ton) when the ratio is larger than the predetermined value (RV).

6. A motor control circuit (MC) as claimed in claim 1, wherein the switching circuit (1) comprises a full bridge of electronic switches (S1, S2, S3, S4), and wherein the controller (2) is constructed for controlling the electronic switches (S1, S2, S3, S4) of the full bridge to obtain an AC motor drive signal (Vm).

7. A motor control circuit (MC) as claimed in claim 1, wherein the switching circuit (1) comprises a single switching device (S5) with internal freewheeling diode (D5) to obtain a DC motor drive signal (Vm).

8. A motor system comprising a motor (M) and a motor control circuit (MC) as claimed in claim 1, wherein the motor drive signal (Vm) is supplied to input terminals of the motor (M).

9. An appliance comprising the motor system of claim 8.

10. An appliance as claimed in claim 9 being one out of the group of vacuum cleaners, washing machines, shavers, blenders, kitchen machines.

11. A method of controlling a motor power comprising:
    intermittently coupling (1) a rectified input voltage (Vrm) to the motor (M) during an on-state (Ton) and decoupling the rectified input voltage (Vrm) from the motor (M) during an off-state (Toff),
    controlling (2) the intermittently coupling (1):
(i) to couple the rectified input voltage (Vrm) to the motor during a first period in time (T1) when an amount of magnetic saturation of the motor is smaller than a predetermined value, and
(ii) to alternately couple during the on-state (Ton) to, and to decouple during the off-state (Toff) from the motor (M) the rectified input voltage (Vrm) to obtain a pulse width control of the motor drive signal (Vm) during a second period in time (T2) when the amount of magnetic saturation of the motor (M) is larger than the predetermined value.

* * * * *